US008668887B2

(12) United States Patent
McGarvey et al.

(10) Patent No.: US 8,668,887 B2
(45) Date of Patent: Mar. 11, 2014

(54) IN SITU GENERATION OF POLYSULFIDE IONS USING ELEMENTAL SULFUR FOR IMPROVED CORROSION CONTROL, CYANIDE MANAGEMENT, MERCURY MANAGEMENT, ARSINE MANAGEMENT AND PERFORMANCE AND RELIABILITY OF ACID GAS REMOVAL EQUIPMENT

(75) Inventors: Gordon Bryce McGarvey, Sarnia (CA); Robert J. Falkiner, Brampton (CA); David R. Slim, Sarnia (CA); Bryan M. Knickerbocker, Centreville, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/568,561

(22) Filed: Aug. 7, 2012

(65) Prior Publication Data

US 2014/0042362 A1   Feb. 13, 2014

(51) Int. Cl.
  *B01D 53/52*   (2006.01)
  *B01D 53/54*   (2006.01)
  *B01D 53/64*   (2006.01)
  *B01D 53/77*   (2006.01)
  *C23F 11/00*   (2006.01)

(52) U.S. Cl.
  USPC ........... 423/210; 423/236; 423/371; 423/511; 423/562; 423/565; 422/7; 422/129; 422/168; 252/387

(58) Field of Classification Search
  USPC ................. 423/511, 562, 565, 210, 371, 236; 252/387; 422/7, 129, 168
  See application file for complete search history.

(56) References Cited

U.S. PATENT DOCUMENTS

| | | | |
|---|---|---|---|
| 3,887,330 A * | 6/1975 | Horvath | 422/7 |
| 4,112,050 A | 9/1978 | Sartori et al. | |
| 4,147,626 A * | 4/1979 | Findlay et al. | 210/724 |
| 4,405,586 A | 9/1983 | Sartori et al. | |
| 4,405,851 A | 9/1983 | Sheldon | |
| 4,471,138 A | 9/1984 | Stogryn | |
| 4,508,693 A * | 4/1985 | Diaz | 423/236 |
| 4,654,148 A * | 3/1987 | Baker | 210/766 |
| 4,834,953 A | 5/1989 | Audeh | |
| 4,857,283 A | 8/1989 | Madden, II | |
| 4,944,917 A | 7/1990 | Madden, II et al. | |

(Continued)

FOREIGN PATENT DOCUMENTS

EP      102712 B1    3/1983
EP     0102712 B1    3/1989

OTHER PUBLICATIONS

Yan, Reaction of Trace Mercury in Natural Gas With Dilute Polysulfide Solutions in a Packed Column, Industrial and Engineering Chemistry Research, vol. 30, pp. 2592-2595 (1991).

(Continued)

*Primary Examiner* — Timothy Vanoy
(74) *Attorney, Agent, or Firm* — Malcolm D. Keen; Glenn T. Barrett

(57) ABSTRACT

Methods and systems are provided for the in situ generation of polysulfide ions in a process stream including $S^{2-}$ and/or $HS^-$ ions. Methods and systems are also provided to ameliorate corrosion in a process stream containing an acid gas or a scrubbing agent solvent, and abate mercury and cyanide in process streams containing a scrubbing agent solvent.

21 Claims, 3 Drawing Sheets

(56) References Cited

U.S. PATENT DOCUMENTS

| | | |
|---|---|---|
| 4,959,177 A | 9/1990 | Schutt |
| 5,034,203 A * | 7/1991 | Audeh et al. .................. 423/210 |
| 5,188,179 A * | 2/1993 | Gay et al. ...................... 166/310 |
| 5,618,408 A | 4/1997 | Poirier et al. |
| 6,544,492 B1 * | 4/2003 | DeBerry ..................... 423/573.1 |
| 6,605,234 B1 | 8/2003 | Roof et al. |

OTHER PUBLICATIONS

DeTar, "Effects of Alkyl Groups on Rates of ACYL—Transfer Reactions", Journal of Organic Chemistry, vol. 45, pp. 5166-5174 (1980).

Rooney et al., "Effect of Heat Stable Salts on MDEA Solution Corrosivity", Parts 1 and 2, Hydrocarbon Processing, Mar. 1996 and Apr. 1997.

* cited by examiner

IN SITU GENERATION OF POLYSULFIDE IONS USING ELEMENTAL SULFUR FOR IMPROVED CORROSION CONTROL, CYANIDE MANAGEMENT, MERCURY MANAGEMENT, ARSINE MANAGEMENT AND PERFORMANCE AND RELIABILITY OF ACID GAS REMOVAL EQUIPMENT

FIELD

The disclosed subject matter relates to methods and systems for the in situ generation of polysulfide ions from elemental sulfur. Furthermore, methods and systems are provided for inhibiting corrosion of metal surfaces (e.g., pipes and process stream conduits) that are in contact with $H_2S$, $HS^-$ and/or $S^{2-}$ ions such as those existing in a process stream. Methods and systems are also provided for cyanide and mercury management.

BACKGROUND

Acidic compounds, such as $CO_2$, $H_2S$ and COS can be "scrubbed" with a liquid absorbent medium, referred to herein as a scrubbing agent solvent, and removed from fluid streams under treatment in petrochemical refining processes. Alkaline solutions such as alkanolamines (e.g., monoethanolamine (MEA) or diethanolamine (DEA)), hindered amines, caustic or other appropriate solvents can be employed as scrubbing agents to assist in the removal of the acid gas components.

An operational problem often encountered with such acid gas abatement processes is corrosion of carbon steel and other low-alloy steels that are used in the construction of the piping and vessels. Such corrosion can be attributable to one or more of the following: decomposition of the scrubbing agent solvent, reaction of the acidic components of the gas and the scrubbing agent solvent; and direct attack by the acidic components in the gases.

In addition, acid gas abatement processes can result in the accumulation of heat stable salts (HSS) (for example, due to ingress of reactive contaminants and degradation of amine), which in itself can lead to higher corrosion rate and equipment damage. HSS accumulation also ties up scrubbing agent solvents, reducing the available amount for acid gas absorption. Management of HSS levels can be achieved through a reclamation process or replacement of part of the amine inventory with fresh, uncontaminated amine (bleed and feed or larger bulk replacement). Corrosion inhibition technology is not standard practice in amine treating systems due to the high cost of most programs and undesirable side effects (e.g., foaming). As such, for a typical acid gas treating facility (e.g., an amine scrubbing agent acid gas treating facility) the primary mitigation strategy for corrosion of carbon steel or other low-alloy steels is to replace these materials with more corrosion-resistant stainless steel.

A more recent corrosion control program contemplated for acid-gas treating facilities involves the addition of soluble sodium tetrasulfide to the circulating amine. This program was shown in lab and field studies to form protective iron sulfide layers on carbon steel to reduce corrosion rates. Unfortunately, the high cost of the additive makes this concept economically infeasible. Therefore, the introduction of soluble polysulfide ions was determined to be an effective corrosion mitigation strategy, notwithstanding commercial realities.

Polysulfide ions can be obtained from the air oxidation of sulfide ions that are formed from dissociated hydrogen sulfide in circulating amine solutions. Air oxidation of sulfide ions, however, degrades amine scrubbing agents, produces excessive quantities of additional oxidative HSS by-products that are detrimental to the process, and can react with diolefins to form a polymeric product that fouls equipment. Alternatively, U.S. Pat. Nos. 4,944,917, 4,857,283 and EP 102 712 describe the addition of ammonium or metal polysulfides or other means of forming polysulfide ions into circulating amine treating solutions. Similarly, already-prepared polysulfides could be purchased and added directly to the process stream. Although theoretically successful, the cost of these various chemical addition techniques has proved to be prohibitive in view of their benefits, and has resulted in limited commercial applicability to date.

While the performance benefits of polysulfide ions have been determined, a more cost-effective method of generating the polysulfide ions is desired without the expense of, for example, ammonium or metal polysulfides additives, and without the disadvantages of obtaining polysulfide ions from air oxidized sulfide ions obtained from dissociated hydrogen sulfide. There also remains a need to integrate the polysulfide generation with effective management of corrosion of metal surfaces in chemical or petrochemical operations hydrocarbon refining operations) connection with acid gas removal efforts.

SUMMARY

It has been found that polysulfide ions can be generated in situ (e.g., in the form of an amine polysulfide) by introducing elemental sulfur into a process stream that includes existing $HS^-$ and/or $S^{2-}$ ions. The $HS^-$ and/or $S^{2-}$ ions in the process stream can be provided, for example, by a rich amine scrubbing agent solvent stream that contains amine hydrosulfide or other hydrosulfide or sulfide ion constituents. Effective amounts of circulating polysulfide ions can be achieved from the reaction between elemental sulfur and the $HS^-$ and/or $S^{2-}$ ions to obtain corrosion control, as well as to manage cyanide and mercury levels, while obviating the need for purchasing polysulfides, such as ammonium polysulfides or sodium tetrasulfide.

Accordingly, one aspect of the presently disclosed subject matter provides a method for in situ generation of polysulfide ions that includes providing a process stream including existing $HS^-$ and/or $S^{2-}$ ions, and introducing elemental sulfur to the process stream at suitable conditions to react with the $HS^-$ and/or $S^{2-}$ ions to generate polysulfide ions.

In some embodiments of the method, the $HS^-$ and/or S' ions can be formed in an acid gas abatement process which includes introducing a scrubbing agent solvent to contact a fluid stream containing $H_2S$. For example, the process stream can exit an absorber tower where the scrubbing agent solvent is brought into contact with the fluid stream containing $FI_2S$. The fluid stream can further include other reactive components e.g., $CO_2$, $SO_2$, $SO_3$, $CS_2$, HCN, COS and a $C_1$-$C_4$ thiols. In some embodiments, the scrubbing agent solvent includes at least one of an alkanolamine, a hydroxyamine, a metal hydroxide, a metal carbonate, a metal hydrated oxide, a metal bicarbonate, ammonium or amine cations, and a mixture thereof. For example, the scrubbing agent solvent can be selected from monoethanolamine (MEA), diethanolamine (DEA), triethanolamine (TEA), dipropanolamine (DPA), diisopropanolamine (DIPA), methyldiethanolamine (MDEA), and diethylmonoethanolamine (DEAE).

In some embodiments, elemental sulfur can be introduced to the process by directing the process stream into contact with solid elemental sulfur. For example, the process stream can be directed through a rigid screen having the solid elemental sulfur applied thereon. The elemental sulfur can be obtained from the acid gas abatement process.

Other aspects of the presently disclosed subject matter include utilization of the polysulfide ions to realize corrosion control, mercury management, and cyanide management. For example, in one aspect, a method to ameliorate corrosion of a conduit containing a process stream is provided. In one embodiment, the method includes performing an acid gas abatement process including introducing a scrubbing agent solvent to a fluid stream containing $H_2S$ to convert $H_2S$ to $HS^-$ and/or $S^{2-}$ ions, thereby generating a process stream containing HS and/or $S^{2-}$ ions; introducing elemental sulfur to react with $HS^-$ and/or $S^{2-}$ ions in the process stream so as to generate polysulfide ions, and allowing the polysulfide ions to contact metal surface of the conduit to form metal-polysulfide on the metal surface, thereby ameliorating corrosion of the conduit. Similarly, the polysulfide ions can react with the mercury in the process stream to form mercury sulfide, which can be removed by filtration. $CN^-$ ions in the process stream can also be converted to more benign $SCN^-$ upon reaction with polysulfide ions.

Yet another aspect of the presently disclosed subject matter provides a system for the in situ generation of polysulfide ions in a process stream comprising a conduit containing a process stream including $HS^-$ and/or $S^{2-}$ ions; and a source of elemental sulfur to be introduced the process stream to react with $HS^-$ and/or $S^{2-}$ ions to generate polysulfide ions.

DETAILED DESCRIPTION

Figure 1:
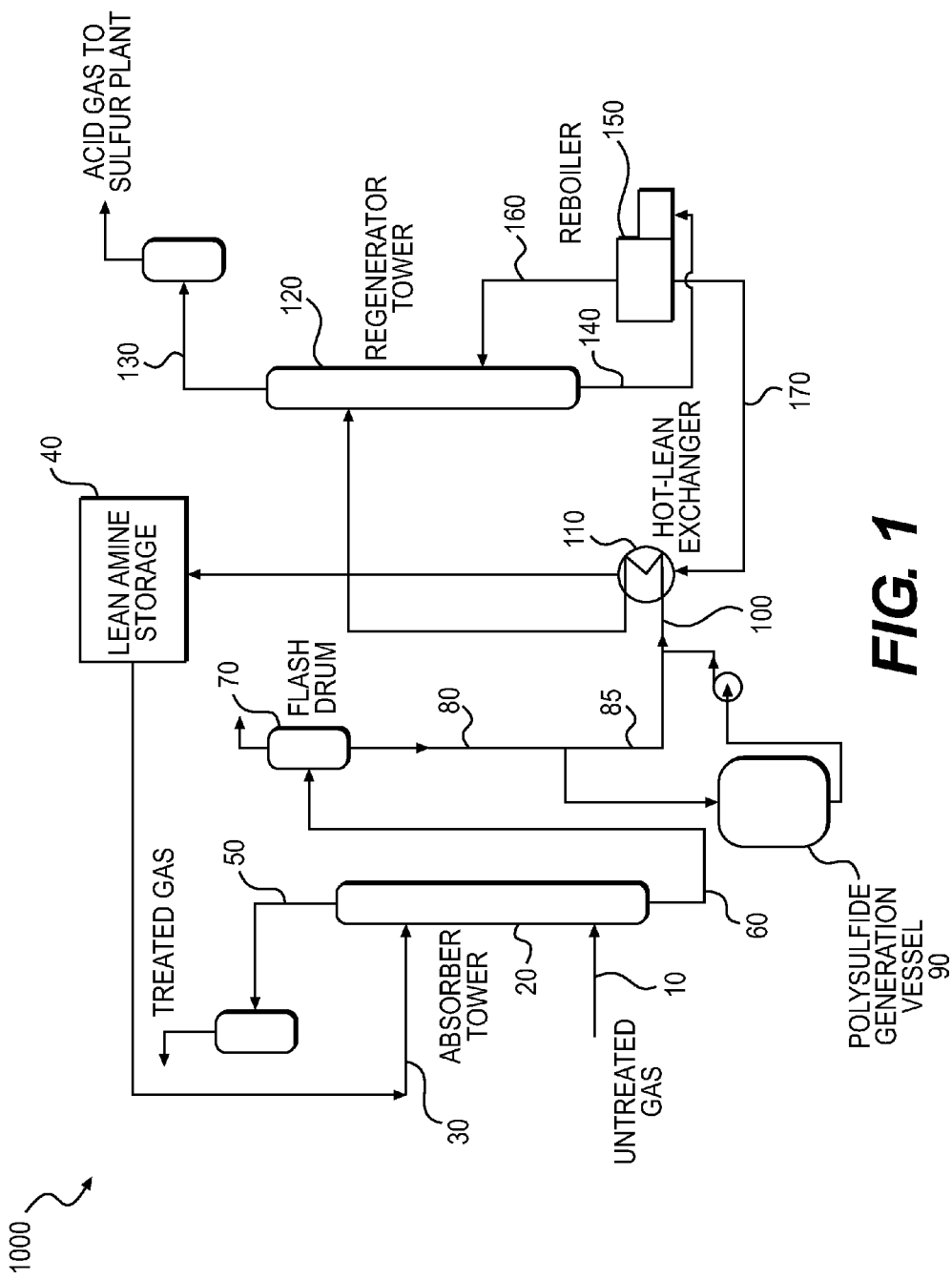
FIG. 1 is a schematic representation of an exemplary refinery acid gas treating unit.

While the disclosed subject matter may be embodied in many different forms, reference will now be made in detail to specific embodiments of the disclosed subject, examples of which are illustrated in the accompanying drawings. This description is an exemplification of the principles of the disclosed subject and is not intended to limit the disclosed subject matter to the particular embodiments illustrated.

One aspect of the presently disclosed subject matter provides a method for in situ generation of polysulfide ions that includes providing a process stream including existing $HS^-$ and/or $S^{2-}$ ions, and introducing elemental sulfur to the process stream at suitable conditions to react with the $HS^-$ and/or $S^2$ ions to generate polysulfide ions. As described further below, the $HS^-$ and/or $S^{2-}$ ions can be formed by an acid gas abatement process that includes introducing a scrubbing agent solvent to a fluid stream containing $H_2S$. The process stream can be, for example, a stream that contains a rich scrubbing agent solvent (e.g., a process stream exiting an absorber tower that is used as part of an acid gas abatement process, where the acid gas is brought into contact with the scrubbing agent solvent.

In accordance with another aspect of the disclosed subject matter, a system for the in situ generation of polysulfide ions is provided. The system includes a conduit containing a process stream including $HS^-$ and/or $S^{2-}$ ions; and a source of elemental sulfur to be introduced the process stream to react with $HS^-$ and/or $S^{2-}$ ions to generate polysulfide ions.

For illustration and not limitation, the method and system will be described below in conjunction with each other. A person of ordinary skill in the art will appreciate the system based on the description of the corresponding methods, and vice versa, as disclosed herein.

Particularly, reference is now made to petrochemical refining operations and systems, although the disclosed methods and systems are suitable and applicable for other operations involving process streams that can accommodate elemental sulfur to form polysulfide ions. Reference will now be made to non-limiting embodiments of the disclosed methods and systems, and features thereof.

As used herein, "process stream" is broadly used to refer to any contained liquid or gas in connection with a chemical processing operation (e.g., a petrochemical refining operation). For illustration and not limitation, an example of a process stream as described herein is a process stream formed by the introduction and reaction of a scrubbing agent solvent with an acid gas (and subsequent reactions with elemental sulfur). The process stream can exit the absorber tower and after a series of treatments, re-enters the absorber tower. It is readily apparent from the description herein, and understood by someone skilled in the art, that the composition of the process stream, such as the identity and/or concentration of the chemical species contained therein (e.g., $H_2S$, $S^{2-}$, $HS^-$, $S_x^{2-}$, cations such as ammonium cations, and other by-products of the reaction between the scrubbing agent solvent with the acid gas), can change as the process stream travels along the path of the conduit which contains the process stream.

The scrubbing agent solvent for acid gas abatement of the fluid stream can be selected from, for example, an alkanolamine, a hydroxyamine, a metal hydroxide, a metal carbonate, a metal hydrated oxide, a metal bicarbonate, and the like. The acid gas scrubbing agent solvents can also include other similar inorganic salts (i.e., heat stable salts (HSS)) containing ammonium or amine cations, and a mixture thereof. While the presently disclosed subject matter will have applicability to a wide variety of acid gas scrubbing agent solvents, the methods and systems disclosed herein are especially applicable to process streams containing aqueous amine scrubbing agents, particularly alkanolamines (also referred to as aminoalkanols), and sterically-hindered amine scrubbing agents.

The disclosed subject matter is also applicable to amine-promoted alkaline salt scrubbing agents. For amine-promoted aqueous alkali metal salt scrubbing systems, the alkali metal salt can be selected from, for example, alkali metal bicarbonates, carbonates, hydroxides, borates, and phosphates. The cations in these systems can include the alkanolammonium cations, hydroxyammonium cations, and the like, along with various other alkali metal cations that may be present in solution. The concentration of the alkali metal compound can be about 5 to about 95 weight percent of the entire weight of the solution. The desired weight percent of the alkali metal compound is determined based upon the amine used. The weight percent is typically limited by the corrosion rate. For example it may be possible to operate a system at 30 to 50 weight percent if the corrosion rate is controlled. With the application of the presently disclosed subject matter and the control of the corrosion rate, the currently employed amine weight percent ranges can be significantly increased. For MEA, the typical range is 15 to 25 weight percent, which is limited by corrosion. With the limitation of corrosion, the range can be extended from below 5 weight percent to in excess of 50 weight percent or broader. In certain embodiments, potassium carbonate is used in a concentration of from about 20 to about 35 weight percent. In an alternative embodiment, sodium hydroxide is used at a concentration of from about 5 to about 30 weight percent.

Non-limiting examples of the scrubbing agent solvent includes at least one of an alkanolamine, a hydroxyamine, a metal hydroxide, a metal carbonate, a metal hydrated oxide, a metal bicarbonate, ammonium or amine cations, and a mixture thereof. For example, the scrubbing agent solvent can be selected from monoethanolamine. (MEA), diethanolamine (DEA), triethanolamine (TEA), dipropanolamine (DPA), diisopropanolamine (DTPA), methyldiethanolamine (MDEA), and diethylmonoethanolamine (DEAE). Scrubbing agents solvents for use in the presently disclosed subject matter further include, but are not limited to 2-piperidine ethanol (PE), sulfolane (2,3,4,5-tetrahydro-thiophene-1,1-dioxide); 2,3,4,5-tetrahydrothiophene-1,1-dioxide with diisopropanol amine and potassium carbonate solutions. In one embodiment, the scrubbing agent solvent includes monoethanolamine.

In addition, the amine scrubbing agent solvents can be sterically hindered, such as those disclosed in U.S. Pat. Nos. 4,471,138; 4,405,586; 4,405,851; and 4,112,050, all of which are incorporated herein by reference. As used herein, "sterically hindered" refers to those amino compounds having a degree of steric hindrance such that the cumulative $-E_s$ value (Taft's steric hindrance constant) is greater than about 1.75 as calculated from the values given for primary amines in Table V in D. F. Detar, Journal of Organic Chemistry, 45, 5174 (1980), which is hereby incorporated by reference.

In one embodiment, amino compound scrubbing agent solvents have a $pK_a$ value, at 20° C., greater than 8.6, preferably greater than about 9.5. In embodiments that employ amino ether alcohols as scrubbing agent solvents, the $pK_a$ value can range, in certain embodiments, between about 9.5 and about 10.6. If the $pK_a$ is less than 8.6 the reaction with $H_2S$ may decreased to an unacceptable level (depending on the application), whereas if the $pK_a$ of the amine compound is much greater than about 10.6, an excessive amount of steam could be required to regenerate the scrubbing agent solvent. Also, to ensure operational efficiency with minimal losses of the amine compound, the amine compound scrubbing agent, in certain embodiments, can have a relatively low volatility. For example, the boiling point of the amine compound (at 760 mm) can be greater than about 180° C., or greater than 200° C., and greater than 225° C. according to certain, non-limiting embodiments of the presently disclosed subject matter.

In some embodiments, the amine scrubbing agent solvent can have a concentration of amine compound in solution of from about 0.1 to about 6 moles per liter of the total solution, or from about 1 to about 4 moles per liter, depending primarily on the specific amine compound employed. In alternative embodiments, the scrubbing agent solvent can include an amine component having an amine strength of at least 5% to about 60%, which denotes the effective amount of amine that would be available to react with an acid gas assuming some amine will react with the acid and therefore be in salt form.

The scrubbing agent solvent in the form of a "lean" scrubbing agent solvent is introduced to the acid gas components (e.g., at an absorber tower) via a circulating stream. The "rich" solution resulting from the contacting of the acid gas stream with the scrubbing agent solvent can contain >0.05 mol H2S/mol scrubbing agent solvent, or >0.10 mol H2S/mol scrubbing agent solvent, or >0.15 mol H2S/mol scrubbing agent solvent. Formulated solvents (e.g. commercially available formulated solvents) can be employed as scrubbing agent solvents. Examples of formulated solvents include Ucarsol® and Flexsorb®, etc.

The scrubbing agent solvent can further include a variety of additives typically employed in selective gas removal processes, e.g., antifoaming agents, anti-oxidants, and the like. The amount of these additives will typically be in the range that they are effective, i.e., an effective amount.

As previously noted, the scrubbing agent solvent produces acid gas abatement for a fluid stream. For purpose of illustration, the acid gas-containing fluid stream to be treated by the presently described methods and systems can include a fluid stream containing $H_2S$. The fluid stream can be, for example, a gaseous stream. Other acid gases can also be present in the fluid stream, including, but not limited to, $CO_2$, $SO_2$, $SO_3$, $CS_2$, HCN, COS and the oxygen, and sulfur derivatives of $C_1$ to $C_4$ hydrocarbons. These are limited to $C_1$-$C_4$ thiols. Except for $CO_2$ and $H_2S$, these gases normally are present only in small amounts within a gaseous mixture or feed. Such acid gas-containing gaseous streams can result, for example, from the processing of oil, chemicals, and coal.

The presently disclosed systems and methods therefore provide for facile and commercially feasible in situ generation of polysulfide ions in process streams that contain circulating amine solutions. The source of sulfide ions can be Obtained from dissociated hydrogen sulfide in the circulating amine treating solutions, i.e., rich amine solutions. While air oxidation of these ions is known to produce polysulfide ions as desired, this has a significant detrimental effect of degrading amine and forming excessive quantities of additional oxidative HSS byproducts, diolefin polymers, aldehyde and other oxygenate polymers that are detrimental to the process. The disclosed subject matter provides the ability to generate polysulfide ions in situ that is not detrimental to the overall process and results in a net beneficial effect without high additive costs to sustain the process.

The following reactions in the formation of polysulfide ions upon reacting elemental sulfur with an HS⁻ ion are noted for purpose of illustration, and not limitation:

  (1)

  (2)

  (3)

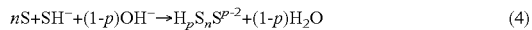  (4)

  (5)

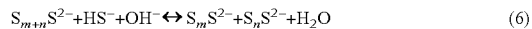  (6)

where $S_mS^{2-}+S_nS^{2-}$ are polysulfide ions with different sulfur chain lengths. While many species can be present in the generation of polysulfide illustrated above, primary reaction schemes generate polysulfide species with chain lengths between 2 or 8 or higher. An equilibrium distribution of different polysulfides depends on, for example, solution component concentrations, temperature, pressure and pH.

The elemental sulfur for reaction with the $SH^-$ and/or $S^{2-}$ ions in the process stream can be provided in solid form, for example, a solid block, a collection of pellets or ground into a powder. The elemental sulfur can be amorphous or crystalline, and can belong to any of the known allotropes or phases of sulfur, for example, cyclo-sulfur (e.g., cyclooctasulfur) and catenasulfur forms. Elemental sulfur can be introduced to the process, for example, by directing the process stream through a rigid screen with solid elemental sulfur applied thereon. Alternatively, the sulfur can be directly added to the process stream, as a slurry or by a slipstream of scrubbing agent solvent, e.g., amine.

Elemental sulfur can be obtained as a byproduct of removing sulfur-containing contaminants from natural gas and petroleum. In one embodiment, the sulfur can be obtained from a sulfur recovery unit, such as a sulfur recovery unit within a petroleum refinery. The acid gas abatement process itself can provide the source of sulfur to be recovered at the sulfur recovery unit. For example, and not for purpose of limitation, elemental sulfur can be obtained from acid gas abatement process via the following reaction scheme:

$$2H_2S + 3O_2 \rightarrow 2SO_2 + 2H_2O \quad (7)$$

$$2H_2S + SO_2 \rightarrow 3S + 2H_2O \quad (8)$$

$$\text{Overall: } 20H_2S + 10O_2 \rightarrow 4H_2S + 2SO_2 + 7S_2 + 16H_2O \quad (9)$$

This solid sulfur typically forms following a cooling of liquid sulfur and can be applied either a chunks or pieces broken from a larger mass of sulfur, or alternatively, liquid sulfur can be solidified in a mold of specified dimensions.

For purpose of illustration and not limitation, reference is now made to FIG. 1, which depicts a schematic representation of an exemplary refinery acid gas treating unit (1000). An untreated fluid stream containing acid gas components (10) including hydrogen sulfide is fed to an absorber tower (20), which also receives a feed of a solution of a lean amine scrubbing agent (30) from a lean amine storage tank or drum (40). Treated gas (50) exiting the overhead of the absorber tower is further processed and eventually released to the atmosphere or directed to other areas within the refinery. The formerly lean amine scrubbing agent, having been loaded with hydrosulfide and/or disulfide ions upon reaction with H$_2$S in the absorber tower (e.g., in the form of amine hydrosulfide), is now considered a rich amine process stream (60).

The rich amine process stream is introduced to a flash drum (70), and then directed from the bottom of the flash drum (80) to a polysulfide generation vessel (90). The polysulfide generation vessel can take the form of a vessel for suitable structure and constituents that contains solid sulfur, such as supported on a rigid screen, through which the process stream (80) is directed. Flowing rich amine process stream contacts the stationary sulfur bed at suitable pressure and temperature conditions to drive the dissolution and the subsequent formation of polysulfide ions that subsequently circulate through the system and participate in the iron sulfide film formation reaction. Alternatively, as needed, the polysulfide generation vessel can be bypassed via bypass stream (85).

After being introduced to elemental sulfur in the polysulfide generation facility, the process stream (100) is introduced to a hot lean heat exchanger (110) where it is heated and introduced to a regeneration tower (120). The overhead stream (130) from the regeneration tower contains isolated acid gas components, which are eventually directed to, for example, a sulfur plant, which in turn can provide the sulfur to be used within the polysulfide generation facility. The process stream from the bottom of the regeneration tower (140), which still contain the in situ generated polysulfide ions, is directed to a reboiler (150). A portion of the heated process stream (160) is directed back to the regeneration tower as reboiler reflux, and a portion (170) is directed to the hot lean heat exchanger to be cooled by the process stream (100) leaving the polysulfide generation facility for eventual storage in the lean amine storage tank. It is contemplated that the presently disclosed subject matter may be operated at or near standard operating conditions. It is also contemplated that the presently disclosed subject matter may be used in non standard operating conditions that are outside of normal operating ranges. For example, by running amines at a substantial higher concentrations, the system could be operating at significantly lower temperatures (e.g., below freezing temperatures). Once generated, polysulfide solutions are stable, with high-temperature degradation being the only known degradation process. Aqueous polysulfide is stable up to temperatures of 260-265° F., but if the temperature exceeds 275° F., degradation will occur, which will lower the concentration of active polysulfide.

Corrosion Control

Corrosion of metal surfaces of an acid-gas treatment facility that is in contact with 1) a scrubbing agent solvent and 2) hydrogen sulfide and/or hydrogen sulfide ion, can be ameliorated using the polysulfide ions formed by the in situ reaction between the elemental sulfur and SH$^-$ and/or S$^{2-}$ ions. Examples of metal surfaces to be protected in accordance with the disclosed subject matter include ferrous alloys used in gas treating equipment. Without benefit of polysulfide ions, this corrosion can otherwise occur, for example, throughout the entire gas treating system on metal surfaces in contact with the solutions and the acid gas. For purpose of illustration and not limitation, the reaction between iron and polysulfide ions is shown below:

$$S_x^{2-} + Fe \rightarrow FeS_x \quad (10).$$

Other protective sulfide compounds could also be formed from the polysulfide ions, including metal sulfide such as, but not limited to, chromium sulfide, manganese sulfide, nickel sulfide and other metals based on components of alloys used in pipes and other process stream conduits. In accordance with the presently disclosed subject matter, the metal sulfide film is intended to encompass both metal sulfide film and metal polysulfide film. As such, X can be greater than, less than or equal to 1. X may be between 0.1 and 2. X is dependent on temperature, sulfide content, elemental sulfur content, and the ratio of sulfide content to elemental sulfur content (polysulfide chain length).

As the polysulfide ions are circulated through the conduit containing the amine scubbing agent, the polysulfide ions can contact the metal surface of the process equipment to form metal-polysulfide, e.g., in the form of a protective film or layer, which can ameliorate or reduce corrosion of the process equipment.

Cyanide Control

Polysulfide ions can also manage the impact of cyanide ions in scrubbing agent solvent, to control the negative effects of cyanide in acid gas treatment processes. For example, the introduction of elemental sulfur to generate polysulfide ions can prevent hydrogen embrittlement in the upper parts of a regeneration tower. The HCN amine salt partially decomposes in the upper section of the regenerator to give HCN which produces H' ions. H' penetrates the metal structure and gets converted to a larger H$_2$ molecule, causing tremendous force inside the metal that causes it to split.

In situ generated polysulfide ions can be used to convert cyanide ions to form the more benign thiocyanate ions and a polysulfide ion with one less sulfur atom:

$$CN^- + S_n^{2-} \rightarrow SCN^- + S_{n-1}^{2-} \quad (11).$$

This reaction can proceed at high rate depending on the concentration of the polysulfide ions in the circulating scrubbing solution. Due to reaction with polysulfide ion, the cyanide concentration of the process stream can be maintained below 50 ppm. The thiocyanate ions can be left in the process stream. The thiocyanate ions are part of the heat stable salts (HSS).

Mercury Control

The presently disclosed methods and systems also provide mercury control. Mercury is found in at least trace quantities in all crudes and condensates. Typical refineries attempt to limit mercury in the total crude slate to very low values, and periodically monitor mercury in products such as LPG. Thus refineries generally must be cautious in the selection of crudes to avoid mercury in end products. Mercury is becoming more of an issue as more challenged crudes come on the market, and as the regulatory environment changes. Conventional technology to remove mercury from refinery streams involves installing new fixed beds, filled with sulfur-impregnated solids. A silver-promoted molecular sieve (HgSIV) in driers has been used to absorb Hg. The Hg amalgam, however, decomposes during regeneration and the Hg in the off-gas must be managed in a secondary treater. The presently disclosed subject matter provides the ability to use existing equipment to precipitate soluble/reactive mercury as an insoluble mercury sulfide that can be subsequently removed by filtration.

Polysulfide can react with elemental mercury to form insoluble mercury sulfide via, for example, the following reaction:

$$Hg + S_n^{2-} \rightarrow HgS + S_{n-1}^{2-} \quad (12).$$

Thus mercury can be removed from a process stream by introducing polysulfide. Mercury sulfide can be removed from the process stream via standard filtration techniques known to those of ordinary skill in the art (e.g., by physical filtration). Thus, the techniques presently disclosed can allow conversion of deleterious elemental mercury to relatively benign mercury sulfide at a much higher rate of reaction due to higher concentration of polysulfide in the circulating scrubbing solution. Further details can be found in Yan, Ind. Eng. Chem. Res., 30: 2592-2595 (1991), which is hereby incorporated by reference in its entirety. In one embodiment, polysulfide ions are present, and mercury is removed, in a process stream that contains a scrubbing agent solvent (e.g., an aqueous circulating rich amine stream). This can prevent mercury contamination from being a problem in downstream hydrocarbon service.

Arsine Control

The presently disclosed methods and systems also provide arsine control. The presently disclosed subject matter provides the ability to use existing equipment to precipitate arsine as an insoluble arsenic trisulfide that can be subsequently removed by filtration.

Polysulfide can react with arsine to form insoluble arsenic trisulfide via, for example, the following reaction:

$$xAsH_3 + S_x^{2-} \rightarrow As_2S_3 + H_2S \quad (13).$$

Thus arsine can be removed from a process stream by introducing polysulfide. Arsenic trisulfide can be removed from the process stream via standard filtration techniques known to those of ordinary skill in the art (e.g., by physical filtration). Thus, the techniques presently disclosed can allow conversion of deleterious arsine.

In addition to the benefits of reduced corrosion of vulnerable process equipment (e.g., low-alloy steel), as well as mercury, cyanide and arsine control, as discussed above, additional related benefits for the methods and systems described herein for the in situ generation of polysulfide ions include the ability to: operate with higher amine strength, lower circulation rates and steam requirements; operate with elevated heat stable salt concentrations; and operate with higher acid gas loading. For example, the presently disclosed techniques can allow operation with heat stable salts exceeding 3 wt %, operating with scrubbing agent solvent MEA at concentrations exceeding 25%, or DEA at concentrations exceeding 35%, and rich amine loadings for rich amine loadings for MEA or DEA exceeding 0.5-0.7 moles acid gas/mole amine in presence of significant $CO_2$ or 0.7 mol/mol loading with low $CO_2$. It is contemplated that conventional acid gas treatment in refineries can be used in the process of this application without significant modification. The physical properties, especially the density of amine polysulfide solutions vs. amine sulfide solutions (rich amine) can be also used to further reduce the capital cost of installation, and simplify operation of additive generation and injection equipment. For example, the density of the amine polysulfide solutions can be used to create a simple generation and injection facility, since amine polysulfide will be generated at the bottom of the vessel, and can then be directed from the vessel and to the process stream.

EXAMPLES

The present invention is illustrated in greater detail by the specific examples presented below. It is understood that these examples are illustrative embodiments and are not intended to be limiting in any way.

Example 1

Generation of Polysulfide in Rich Alkanolamine

Elemental sulfur was added to a sample of rich diethanolamine (DEA). Following the addition of elemental sulfur to the rich amine solution, an orange color immediately began to develop. The dissolution of the sulfur continued over the course of 3 days, until the entire two gram aliquot had fully dissolved. Following introduction of the elemental sulfur into the rich amine solution, the previously water-white solution began to immediately turn deep-orange, indicative of the presence of polysulfide ions. This demonstrates the conversion of sulfide to higher density polysulfide which can be used directly or isolated from the solution.

Figure 2:
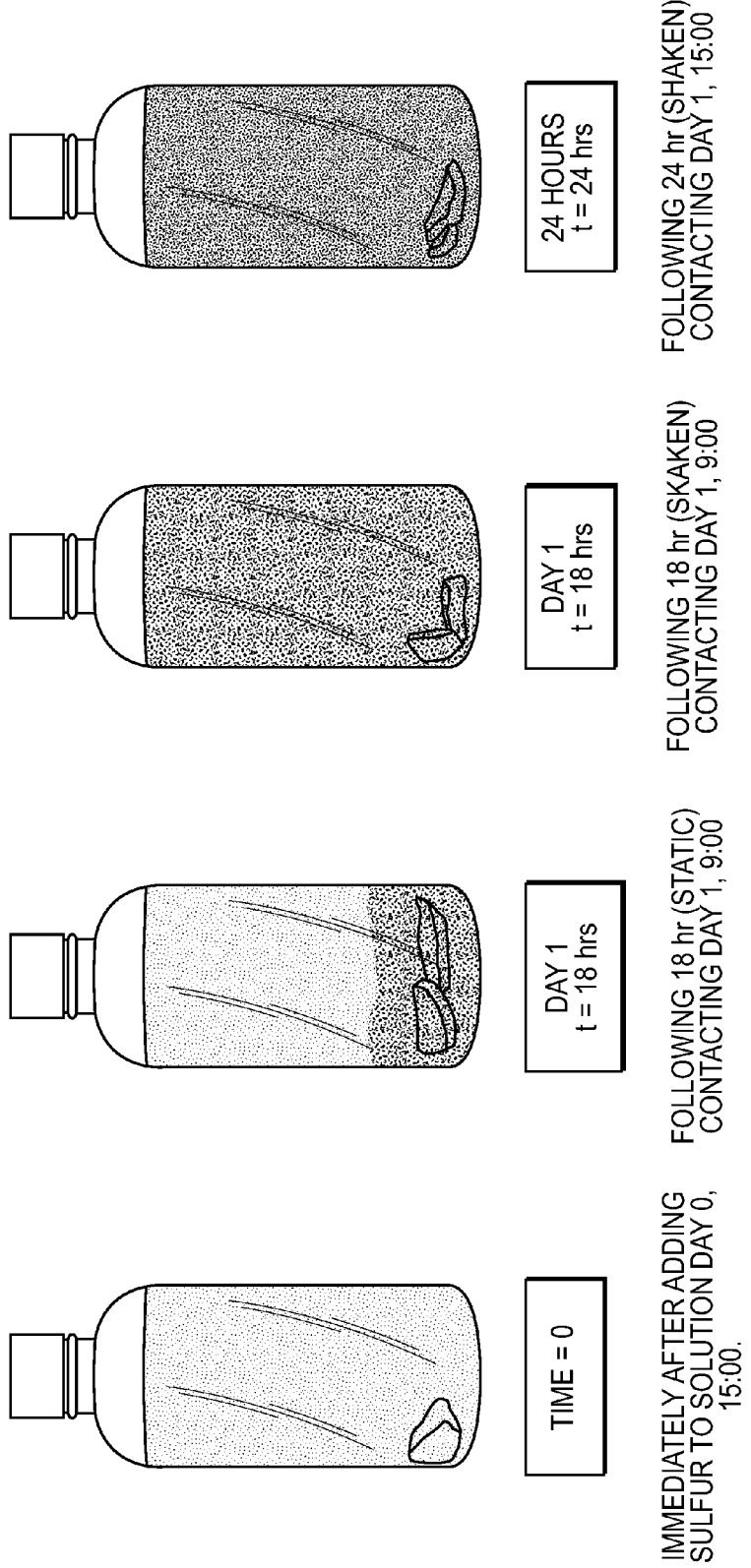
FIG. 2 is a depiction of polysulfide generation over time upon adding elemental sulfur to a rich alkanolamine scrubbing agent solvent.

Results of Experiment 1 are shown in FIG. 2.

Example 2

Generation of Polysulfide in Spent Sulfidic Caustic

Spent sulfidic caustic, which contains NaOH, $Na_2S$, NaSR, $NaCO_3$, $H_2O$, etc. for reaction with elemental sulfur is generated in significant volumes when fresh caustic is placed in contact with gaseous and hydrocarbon streams containing hydrogen sulfide, mercaptans, sulfides and other sulfur-containing species. The sulfidic caustic contains approximately 10% NaOH, 3% $Na_2S$, 1% $Na_2CO_3$ with the balance water.

Disposal of spent caustic is expensive and conversion to a useful product would be beneficial. In Example 2, the solution of simulated spent caustic was prepared in the laboratory using sodium hydroxide and sodium sulfide. Following introduction of the elemental sulfur into the aqueous solution, the previously water-white solution began to immediately turn deep-orange, indicative of the presence of polysulfide ions. Over the course of 24 hours, the entire two gram aliquot of sulfur had dissolved in the solution. This demonstrates the conversion of sulfide to polysulfide which can be used directly or isolated from the solution.

Figure 3:
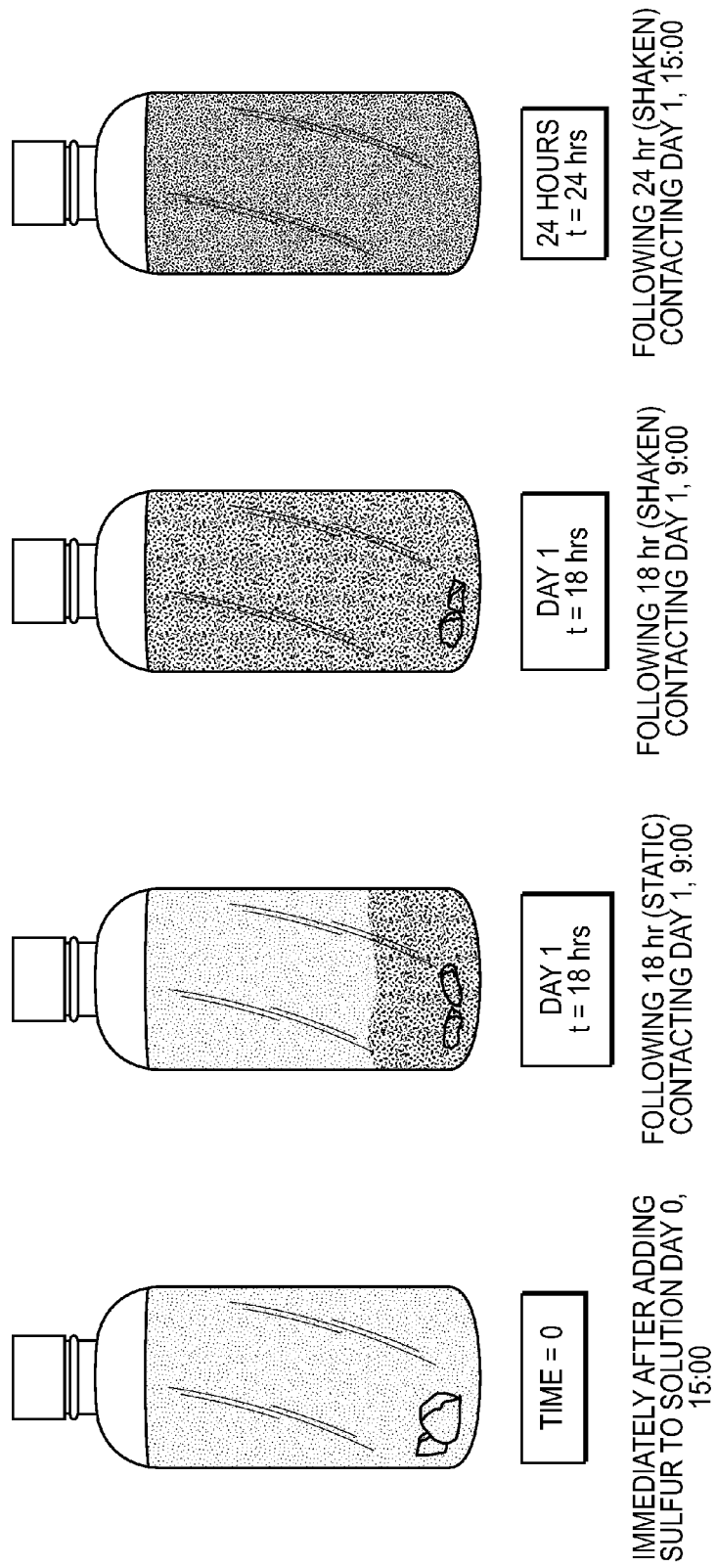
FIG. 3 is a depiction of polysulfide generation over time upon adding elemental sulfur to a simulated spent sulfidic caustic scrubbing agent solvent.

Results of Experiment 2 are shown in FIG. 3.

Examples 1 and 2 demonstrate the facile generation of polysulfide ions in basic solutions containing sulfide ions using elemental sulfur. Once generated, the polysulfide ions can be circulated through amine-treating circuits (including, but not limited to MEA, DEA, MDEA, DIPA and formulated amines used in various acid gas treating processes) and provide corrosion inhibition/protection to piping and vessels through the formation of robust metal sulfide films or surface layers. The films that are formed include metal sulfides, such as, but not limited to, iron, chromium, manganese, nickel and other components of construction alloys that form sulfides.

It was found in both examples of the application that the dissolution of the sulfur occurred without loss of integrity of the sulfur chunk—the sulfur did not lose structural form and decompose into a powder. Subsequent tests carried out with elemental sulfur that was ground into a powder showed that the dissolution rate was increased. Any phase, form or allotrope of elemental sulfur can be used in the disclosed methods and systems, including cyclo-sulfur and catenasulfur forms. Of particular value for this process is the use of elemental sulfur that is produced from the conversion of acid gas streams containing hydrogen sulfide. This solid sulfur typically forms following a cooling of liquid sulfur and can be applied either a chunks or pieces broken from a larger mass of sulfur, or alternatively, liquid sulfur can be solidified in a mold of specified dimensions. The solid sulfur thus obtained can be placed in a vessel through which, for example, rich amine can contact the surface and dissolve the sulfur to produce the polysulfide ions. The rich amine at the bottom of the vessel will always tend toward saturation, so long as there is residual elemental sulfur in the vessel. This allows very simple and inexpensive injection systems to be used, for example a small slipstream of rich amine going into the top of the vessel and saturated amine polysulfide withdrawal out the bottom of the vessel. This can be installed around any convenient source of pressure drop, such as a pump, control valve or filter housing, eliminating the need for more sophisticated injector systems.

The disclosed subject matter is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

What is claimed is:

1. A method for operating an acid gas treatment unit with reduced corrosion comprising:
   (a) contacting an acid gas stream containing H2S with an aqueous alkaline absorbent solution to absorb the H2S into the solution to form a stream including HS− and/or S2− ions;
   (b) contacting the stream containing the HS− and/or S2− ions with elemental sulfur to react the sulfur with the HS− and/or S2− ions to generate polysulfide ions, and
   (c) regenerating the aqueous alkaline absorbent solution to release acid gas components from the solution, while operating with an accumulation of heat stable salts exceeding 3 wt. percent.

2. The method of claim 1 wherein the aqueous alkaline absorbent solution includes at least one of alkanolamine, a metal hydroxide, a metal carbonate, a metal hydrated oxide, a metal bicarbonate, ammonium or amine cations, or a mixture thereof.

3. The method of claim 2 wherein the aqueous alkaline absorbent solution includes an amine component, the amine component having an amine strength of at least 5%.

4. The method of claim 1 wherein the aqueous alkaline absorbent solution includes an alkanolamine.

5. The method of claim 4, wherein the alkanolamine is selected from monoethanolamine (MEA), diethanolamine (DEA), triethanolamine (TEA), dipropanolamine (DPA), diisopropanolamine (DIPA), methyldiethanolamine (MDEA), and diethylmonoethanolamine (DEAE).

6. The method of claim 1 wherein the acid gas stream further comprises at least one of CO2, SO2, SO3, CS2, HCN, COS and a C1-C4 thiol.

7. The method of claim 1, wherein the aqueous alkaline absorbent solution is contained in an acid gas treatment unit having a low alloy steel surface, the method further comprising:
   allowing the polysulfide ions to contact the metal surface of the acid gas treatment unit to form metal-polysulfide on the metal surface, thereby ameliorating corrosion of the unit.

8. The method of claim 1, wherein the acid gas stream includes mercury, the method further comprising:
   allowing the polysulfide ions to remain in the aqueous alkaline absorbent solution to react with the mercury to form mercury sulfide; and
   filtering the mercury sulfide from the aqueous alkaline absorbent solution stream.

9. The method of claim 1, wherein the acid gas stream includes cyanide ions, the method further comprising:
   allowing the polysulfide ions to remain in the aqueous alkaline absorbent solution to react with the cyanide ions to form thiocyanate ions, thereby reducing the concentration of the cyanide ions in the acid gas stream and creating thiocyanate.

10. The method of claim 1, wherein the acid gas stream includes arsine, the method further comprising:
    allowing the polysulfide ions to remain in the aqueous alkaline absorbent solution to react with the arsine to form arsenic trisulfide; and
    filtering the arsenic trisulfide from the aqueous alkaline absorbent solution.

11. The method of claim 1 in which the stream containing the HS− and/or S2− ions which is contacted with the elemental sulfur to the process to generate polysulfide ions is the stream resulting from the step of contacting the acid gas stream with the aqueous alkaline absorbent solution.

12. A method for treating a gas stream containing acidic components including H2S in an acid gas treatment unit with reduced corrosion, which comprises:
    (i) contacting the acid gas stream with a lean stream of an aqueous amine absorbent solution to absorb the H2S into the solution to form a rich absorbent solution stream including HS− and/or S2− ions;
    (ii) contacting the rich absorbent solution stream containing containing the HS− and/or S2− ions with elemental sulfur to react the sulfur with the HS− and/or S2− ions to generate polysulfide ions, and
    (iii) regenerating the aqueous alkaline absorbent solution to release acid gas components from the solution and form a regenerated stream of lean aqueous amine absorbent while operating with an accumulation of heat stable salts exceeding 3 wt. percent.

13. The method of claim 12 in which the aqueous amine absorbent solution comprises an alkanolamine or and amine, or a mixture thereof.

14. The method of claim 13 in which the aqueous alkaline absorbent solution scrubbing agent solvent includes an alkanolamine.

15. The method of claim 14 in which the alkanolamine is selected from monoethanolamine (MEA), diethanolamine (DEA), triethanolamine (TEA), dipropanolamine (DPA), diisopropanolamine (DIPA), methyldiethanolamine (MDEA), and diethylmonoethanolamine (DEAE).

16. The method of claim 12 in which the aqueous amine absorbent solution has an amine strength of at least 5%.

17. The method of claim 12 in which the aqueous amine absorbent solution is contained in an acid gas treatment unit with a low alloy steel surface and the polysulfide ions contact the steel surface of the unit to form metal-polysulfide on the surface to ameliorate corrosion of the surface.

18. The method of claim 12 in which acid gas stream includes mercury and the polysulfide ions in the aqueous alkaline absorbent solution process stream react with the mercury to form mercury sulfide which is filtered from the absorbent solution stream.

19. The method of claim 12 in which the acid gas process stream includes cyanide ions and the polysulfide ions in the absorbent solution stream react with the cyanide ions to form thiocyanate ions.

20. The method of claim 12 in which the acid gas process stream includes arsine and the polysulfide ions in the aqueous alkaline absorbent solution process stream react with the arsine to form arsenic trisulfide which is filtered from the absorbent solution stream.

21. The method of claim 12 in which the stream containing the HS− and/or S2− ions which is contacted with the elemental sulfur to the process to generate polysulfide ions is the stream resulting from the step of contacting the acid gas stream with the aqueous alkaline absorbent solution.

* * * * *